July 17, 1951          G. T. REICH          2,561,072
PROCESS OF TREATING WASTE CITROUS LIQUORS AND THE LIKE
Filed Sept. 16, 1946
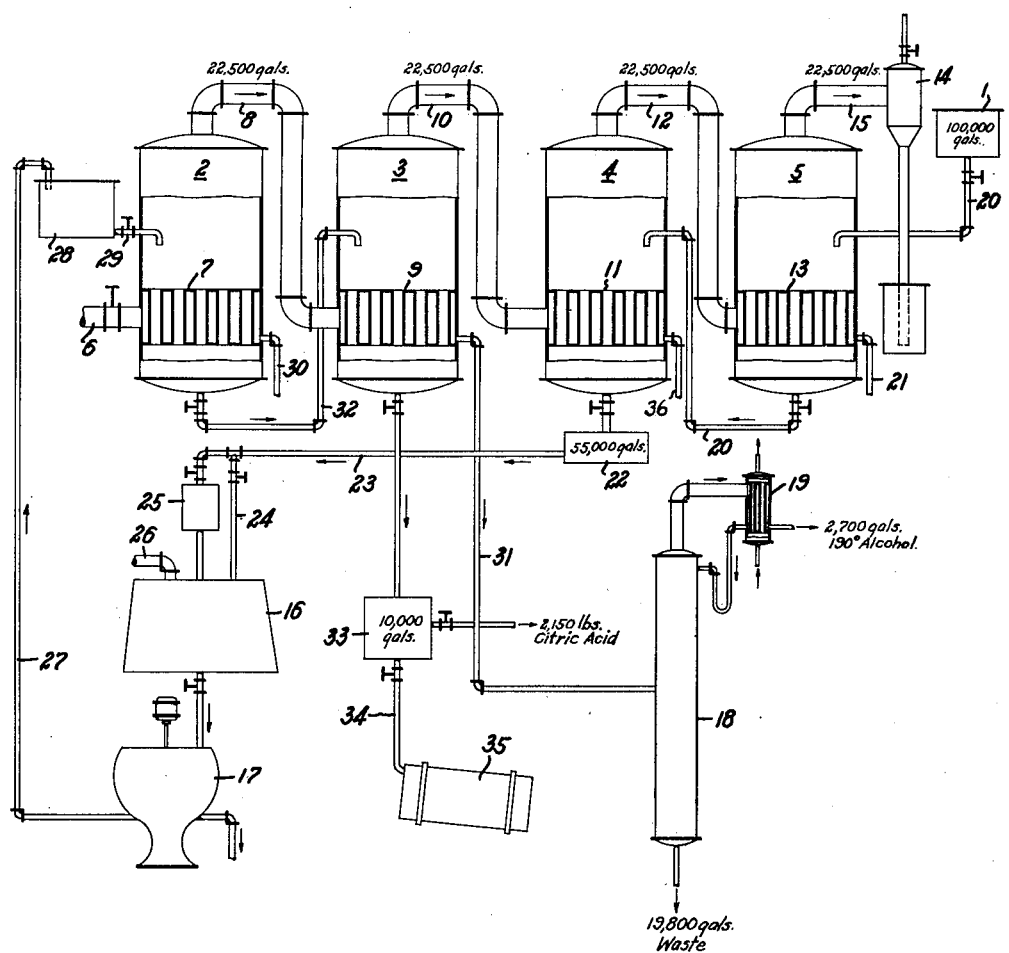

Patented July 17, 1951

2,561,072

UNITED STATES PATENT OFFICE 2,561,072

PROCESS OF TREATING WASTE CITROUS LIQUORS AND THE LIKE

Gustave T. Reich, Philadelphia, Pa.

Application September 16, 1946, Serial No. 697,224

4 Claims. (Cl. 195—33)

This invention relates to the treatment of waste citrous liquors and the like for the recovery of values therefrom.

An object of the invention is to provide an improved process for the recovery of values from waste citrous liquors, such as the waste liquors obtained in the pressing of oranges for extraction of the juice.

A further object is to provide a two-stage process for concentrating the waste liquors wherein a portion of the values from the preliminarily concentrated liquors is recovered between the two stages of concentration. More particularly in this regard, the preliminarily concentrated waste liquors may be subjected to alcoholic fermentation between the concentration stages and alcohol may be separated from the prelimnary concentrate. The yeast developed in the fermentation step may be worked-up for its values.

Another object is to provide a process for the production of a final concentrate of waste citrous liquors capable of being efficiently treated for the recovery of citric acid and other constituents.

Still another object is the provision of a process for the evaporative concentration of waste citrous liquors characterized by a high degree of heat economy, simplicity and ease of operation, and excellent recovery of utilizable values or components of the waste liquors.

Another object is to obtain values from waste citrous liquors and to eliminate the problem of disposal of such liquors, which, if dumped into rivers or streams, would result in undesirable and in some cases illegal pollution.

Yet another object is to recover a concentrated waste citrous liquor free from carbohydrates and citric acid.

In the preparation of citrous juices for the market, the fruit is pressed to extract the juice, the juice being then canned and sold as such or otherwise used for human consumption. A relatively light pressure is applied to the fruit in order to avoid expressing to any considerable extent the oils and other constituents of the skins and pulp, such constituents being undesirable in juice for beverage purposes. The pulp including the skins contains a quantity of expressable liquid, herein referred to as waste citrous liquors, which is removed from the pulp by a second heavy pressing, as in a hydraulic press. Such waste citrous liquors are treated in accordance with the process of the present invention for the recovery of values therefrom.

The waste citrous liquors from the hydraulic pressing operation may be treated as such, or they may, if desired, be subjected to conventional preliminary treatments for the removal of lime and suspended solids. Such preliminary purification may include the addition of sulfuric acid to precipitate the lime and filtration or centrifugation to remove the suspended solids.

Typically, the process of the invention as applied to the treatment of waste citrous liquors and the like includes partially concentrating the liquors, subjecting the partially concentrated liquors to alcoholic fermentation, evaporatively concentrating the fermented liquors and separating alcohol from the vapors of the second concentrating step. Citric acid may be separated from the final concentrate and the residue from the separation may be dried and utilized as an industrial product.

In one embodiment, the process of the invention is advantageously carried out utilizing multiple-stage evaporation for preliminarily and finally concentrating the waste citrous liquors.

The invention will be more particularly described and other of its aims, objects and advantages will be in part apparent and in part pointed out in the following detailed description of a characteristic example of the process which may be performed in the apparatus illustrated in the single figure of the accompanying drawing.

The invention will be described in its exemplary embodiment with reference to the treatment of waste citrous liquors from oranges, but it will be understood that the process is also applicable to the treatment of waste liquors from other citrous fruits.

Referring to the drawing, which is somewhat diagrammatic, there is shown an exemplary waste citrous liquors treating apparatus having a storage tank 1 which contains waste orange liquors. Preferably the waste orange liquors are pretreated by the addition of sulfuric acid to bring the liquors to a pH of about 4.5 and thereafter filtered to remove suspended solid material, including lime precipitate, to provide a clear waste liquor.

The apparatus shown includes a quadruple-effect evaporator having effects designated 2, 3, 4, and 5. Vapor flow is from left to right, as shown in the figure, steam being fed from steam pipe 6 into the calandria 7 of the first effect 2 and vapor from effect 2 being conducted through pipe 8 to the calandria 9 of effect 3. Similarly, vapor pipe 10 supplies vapor to the calandria 11 of effect 4 and vapor pipe 12 supplies vapor from the effect 4 to the calandria 13 of the last effect 5. Vapors from the last effect are conducted to a barometric or other suitable condenser 14 through pipe 15.

The apparatus also includes a fermenting tank 16 and a centrifugal 17 for separating yeast from the fermented liquors. A rectifying column 18 with condenser 19 is also provided for rectifying the wines obtained in the process, as will more fully appear hereinafter.

Waste orange liquor of about 7° Brix in the amount of 100,000 gallons contained in the storage tank 1 is fed at an appropriate rate to the vaporizing chamber of effect 5 through pipe 20. The feed liquor may be preheated to the vaporizing temperature prior to introduction into this effect; such preheating may be accomplished in any desired manner, it being within the purview of the present invention to provide a heat exchanger for recovering waste heat from the system by transfer of such heat to the feed liquor. About 22,500 gallons of the feed liquor is evaporated in effect 5, the vapors therefrom consisting substantially of steam are condensed in the barometric condenser 14 and discarded.

Distilland from effect 5 is transferred at a suitable rate to effect 4 through pipe 20, a pump (not shown) being employed if necessary to effect the transfer. The liquor is further concentrated in effect 4 by removal of an additional 22,500 gallons in the form of vapor, the latent heat of which is released in calandria 13 for evaporation in effect 5. The vapors are condensed in calandria 13 and run to waste through outlet 21.

The preliminarily concentrated liquor, thus reduced to a volume of 55,000 gallons, is run to a holding tank 22. The preliminary concentrate has in solution a solids content of about 12.5%. When the feed liquors contain about 5% of carbohydrates, the preliminary concentrate has a carbohydrate content increased to about 8.9%. At this increased concentration, the production of alcohol is profitable, due in part to the fact that relatively small fermenting equipment will suffice.

The preliminary concentrate is run from the holding tank 22 through pipes 23 and 24 to the fermenter 16, some of it being by-passed through the yeast tub 25 where the required yeast is added. The fermentation is allowed to proceed in the fermenter 16 in the usual manner. Carbon dioxide produced by the fermentation passes off through the vent 26.

The fermented preliminary concentrate or beer is treated in the centrifugal 17 wherein the yeast is removed. The yeast may be dried and sold as cattle feed or otherwise used. The clear beer is conducted through pipe 27 to another holding tank 28 from which it is fed through pipe 29 at an appropriate rate to the first effect 2.

In effect 2 the liquor is further concentrated by removal of an additional 22,500 gallons in the form of vapors, which vapors contain the bulk of the alcohol. Heat is supplied for the evaporation by steam admitted to calandria 7 through pipe 6. Condensed steam from calandria 7 is run to waste through outlet 30.

The alcohol-bearing vapors are passed to calandria 9 of effect 3 and are therein condensed, the heat liberated being used for further concentration in effect 3.

Alcoholic condensate or high wines from calandria 9 passes through pipe 31 to rectifying column 18 wherein the wines are conventionally rectified to yield 2,700 gallons of 190° alcohol and 19,800 gallons of waste distilland. The alcohol so produced has important industrial utility.

Distilland from effect 2 is conducted through pipe 32 to effect 3 wherein it is finally concentrated to a volume of 10,000 gallons by removal of vapors condensing to 22,500 gallons in calandria 11. The final concentrate is removed to tank 33. The vapors condensing in calandria 11 serve to cause evaporation in effect 4 and the condensed vapors are run through outlet 36 to waste.

In tank 33, 2150 pounds of citric acid may be separated in a very pure condition from the final concentrate, as by precipitation as the calcium salt. The citric acid-free stillage is removed through pipe 34 and may be dried in drier 35 or its values otherwise recovered.

In the multiple effect evaporator comprising effects 2, 3, 4, and 5, effects 4 and 5, wherein the waste citrous liquors are preliminarily concentrated, are referred to as the high vacuum end. Effects 2 and 3, wherein the fermented liquors are additionally concentrated are referred to as the low vacuum end of the multiple effect evaporator. It will be evident that fewer or more than four effects may be included in the multiple effect evaporator.

Other forms of apparatus for carrying out the process of the invention will occur to those skilled in the art in the light of the foregoing description and, in fact, the invention as defined in the claims may be practiced utilizing a wide variety of apparatus.

While the foregoing description sets forth a process involving two stages of concentration and an intermediate fermentation step, other combinations are also possible. For example, instead of or in addition to fermenting between concentration stages, it may sometimes be advantageous to recover in an intermediate step other valuable ingredients such as pectin, essential oils, citric acid, or vitamins or to convert the carbohydrates at this stage into an additional amount of citric acid, or lactic or other acid. The underlying principle of the process however is the same, namely, to recover values and simultaneously concentrate the weak and the processed liquors.

I claim:

1. The process of treating waste citrous liquor obtained from the pulp and skins of citrous fruit to recover valuable products therefrom which comprises reducing the volume of said liquor to about 50% of its original volume by evaporating water therefrom, subjecting the thus concentrated liquor to fermentation in the presence of yeast, removing yeast from the fermented liquor, and reducing the volume of the fermented liquor to about 10% of the volume of the original liquor by evaporating water and alcohol therefrom, a major part of the heat required for said first evaporating step being supplied by indirect heat exchange from the vapors generated in said second evaporating step.

2. The process of treating waste citrous liquor obtained from the pulp and skins of citrous fruit to recover valuable products therefrom which comprises reducing the volume of said liquor to about 50% of its original volume by evaporating water therefrom, subjecting the thus concentrated liquor to fermentation in the presence of yeast, removing yeast from the fermented liquor, reducing the volume of the fermented liquor to about 10% of the volume of the original liquor by evaporating water and alcohol therefrom, separating citric acid from the dealcoholized liquor, and substantially drying the residual liquor, a major part of the heat required for said first evaporating step being supplied by indirect heat exchange from the vapors generated in said second evaporating step.

3. The process of treating waste citrous liquor obtained from the pulp and skins of citrous fruit to recover valuable products therefrom which comprises evaporating a substantial portion of water from said liquor, subjecting the thus concentrated liquor to fermentation in the presence of an alcoholic ferment, removing the alcoholic ferment from the fermented liquor, and evaporating alcohol and a major portion of the remaining water from the fermented liquor, a major part of the heat required for said first evaporating step being supplied by indirect heat exchange from the vapors generated in said second evaporating step.

4. The process of treating waste citrous liquor obtained from the pulp and skins of citrous fruit to recover valuable products therefrom which comprises evaporating a substantial portion of water from said liquor, subjecting the thus concentrated liquor to fermentation in the presence of an alcoholic ferment, removing the alcoholic ferment from the fermented liquor, evaporating alcohol and a major portion of the remaining water from the fermented liquor, separating citric acid from the dealcoholized liquor, and substantially drying the residual liquor, a major part of the heat required for said first evaporating step being supplied by indirect heat exchange from the vapors generated in said second evaporating step.

GUSTAVE T. REICH.

REFERENCES CITED

The following references are of record in the file of this patent:

UNITED STATES PATENTS

| Number | Name | Date |
| --- | --- | --- |
| 1,218,638 | Fest | Mar. 13, 1917 |
| 1,528,469 | Davidson | Mar. 3, 1925 |
| 2,072,919 | Zender | Mar. 9, 1937 |
| 2,215,944 | Vincent | Sept. 24, 1940 |
| 2,387,636 | Bailey | Oct. 23, 1945 |

FOREIGN PATENTS

| Number | Country | Date |
| --- | --- | --- |
| 500,281 | Great Britain | 1939 |